United States Patent [19]

Inoue

[11] Patent Number: 4,507,536
[45] Date of Patent: Mar. 26, 1985

[54] BEAM-MACHINING METHOD AND APPARATUS

[75] Inventor: Kiyoshi Inoue, Tokyo, Japan

[73] Assignee: Inoue-Japax Research Incorporated, Yokohama, Japan

[21] Appl. No.: 369,547

[22] Filed: Apr. 19, 1982

[30] Foreign Application Priority Data

Apr. 20, 1981 [JP] Japan .................................. 56-59993

[51] Int. Cl.³ .............................................. B23K 27/00
[52] U.S. Cl. ....................... 219/121 LB; 219/121 LH; 219/121 LJ
[58] Field of Search .................. 219/121 LY, 121 LB, 219/121 LA, 121 LC, 121 LD, 121 EB, 121 EM, 121 EC, 121 ED

[56] References Cited

U.S. PATENT DOCUMENTS

| | | | |
|---|---|---|---|
| 3,648,009 | 3/1972 | Steigerwald | 219/121 ED |
| 3,700,850 | 10/1972 | Lumley et al. | 219/121 LJ |
| 3,982,202 | 5/1975 | Goldstein | 210/163 |
| 3,986,391 | 10/1976 | Vahaviolos | 219/121 LM |
| 4,131,484 | 12/1973 | Caruso et al. | 219/121 LM |

*Primary Examiner*—C. L. Albritton
*Attorney, Agent, or Firm*—Karl F. Ross; Herbert Dubno

[57] ABSTRACT

A method of and apparatus for machining a workpiece such as ceramic with an energy beam, e.g. a beam of energetic ions or a laser beam, produced by a beam generator. A carriage having the workpiece securely mounted thereon and the beam generator are relatively displaced to cause the beam to move in a scanning manner along a prescribed path on the workpiece surface. An acoustic emission from the workpiece being machined is sensed by a transducer disposed in contact therewith to provide a control signal which is applied to the generator for controlling the energy or energy density of the beam and/or to a drive unit for displacing the workpiece relative to the beam generator to control the rate of relative scanning displacement between the energy beam and the workpiece.

14 Claims, 2 Drawing Figures

BEAM-MACHINING METHOD AND APPARATUS

FIELD OF THE INVENTION

The present invention relates to a beam-machining method and apparatus and, more particularly, to a method of and apparatus for machining a workpiece with an energy beam, i.e. a beam of energetic ions, electrons or neutral particles, or a laser beam. The term "machining" is used throughout herein to refer, to material removal such as cutting, boring or engraving.

BACKGROUND OF THE INVENTION

Beam machining is characterized by a machining action utilizing an extremely high energy density and is increasingly being used for machining hard materials. A brittle material such as a ceramic which is difficult to machine with other processes can also be machined advantageously by beam machining thanks to the fact that the high energy density machining ability allows a high machining rate and hence machining feed. Thus, while the problem of cracking has been found to be alleviated, this problem has not completely been solved by the prior beam machining technique. Furthermore, regardless of kinds of materials, beam-machining efficiency could seldom be optimized in the prior technique.

OBJECTS OF THE INVENTION

It is, accordingly, an important object of the present invention to provide an improved beam-machining method whereby the machining efficiency is optimized and a beam-machined workpiece free from cracking and other structural defects is obtained.

Another important object of the invention is to provide a new beam-machining apparatus adapted to carry out the improved method.

SUMMARY OF THE INVENTION

In accordance with the present invention there is provided, in a first aspect thereof, a method of machining a workpiece with an energy beam, which method comprises: relatively displacing the energy beam and the workpiece to cause the beam to move along a prescribed path on the workpiece surface, thereby machining the workpiece; sensing an acoustic emission from the workpiece being machined to provide a control signal; and in response to the control signal, controlling at least one of the energy and the energy density of the beam and the rate of relative displacement between the beam and the workpiece.

Specifically, the beam may be a beam of energetic particles such as ions, electrons or neutral particles, e.g. atoms or molecules and the energy of the beam may be controlled by controlling the velocity of the particles impinging on the workpiece. In case the energetic particles are charged particles, the particle velocity is controlled by controlling the acceleration voltage therefor. The energy density may be controlled by controlling the extraction voltage for extracting the charged particles from a source thereof and thus the density of the charged particles in the beam. Alternatively, the energy beam may be a laser beam and the energy may be controlled by controlling the pumping energy for producing the laser. The energy density of the laser may be controlled by controlling the rate of convergence thereof.

Further specifically, the workpiece is displaced relative to the beam incrementally in response to a sequence of drive pulses and the rate of relative displacement is controlled by controlling the frequency of the drive pulses in response to the control signal.

The invention also provides, in a second aspect thereof, an apparatus for machining a workpiece with an energy beam, which apparatus comprises: a beam generator; carriage means for positioning the workpiece in the path of the energy beam from the generator; means for relatively displacing the beam generator and the carriage means to cause the energy beam to move along a prescribed path on the surface of the workpiece; detector means for sensing an acoustic emission from the workpiece being machined to provide a control signal; and control means responsive to the control signal for controlling at least one of the energy and the energy density of the beam and the rate of relative displacement between the generator and the carriage means.

Specifically, the beam generator may be adapted to generate a beam of energetic particles constituting the energy beam and may include means for accelerating the energy beam for impinging upon the workpiece surface and the control means may be connected to the acceleration means for controlling the kinetic energy of the energetic particles. With charged particles such as ions and electrons, the acceleration means comprises an accelerating voltage supply and the control means is connected to the voltage supply for controlling the magnitude of the accelerating voltage. The generator may also include an extraction power supply for extracting the charged particles from a source and the control means may be connected to the power supply for controlling the density of the charged particles in the beam. Alternatively, the generator may be adapted to generate a laser beam constituting the energy beam and then includes a pumping power supply for the laser. The control means is then connected to the pumping power supply for controlling the energy of the laser beam.

Furthermore, the displacement means may include motor means driven by a succession of drive pulses for displacing the workpiece relative to the generator. The control means is then operative in response to the control signal for controlling the frequency of the drive pulses.

BRIEF DESCRIPTION OF THE DRAWING

These and other features of the present invention as well as advantages thereof will become more readily apparent from a reading of the following description taken with reference to the accompanying drawing in which.

SPECIFIC DESCRIPTION

Figure 1:
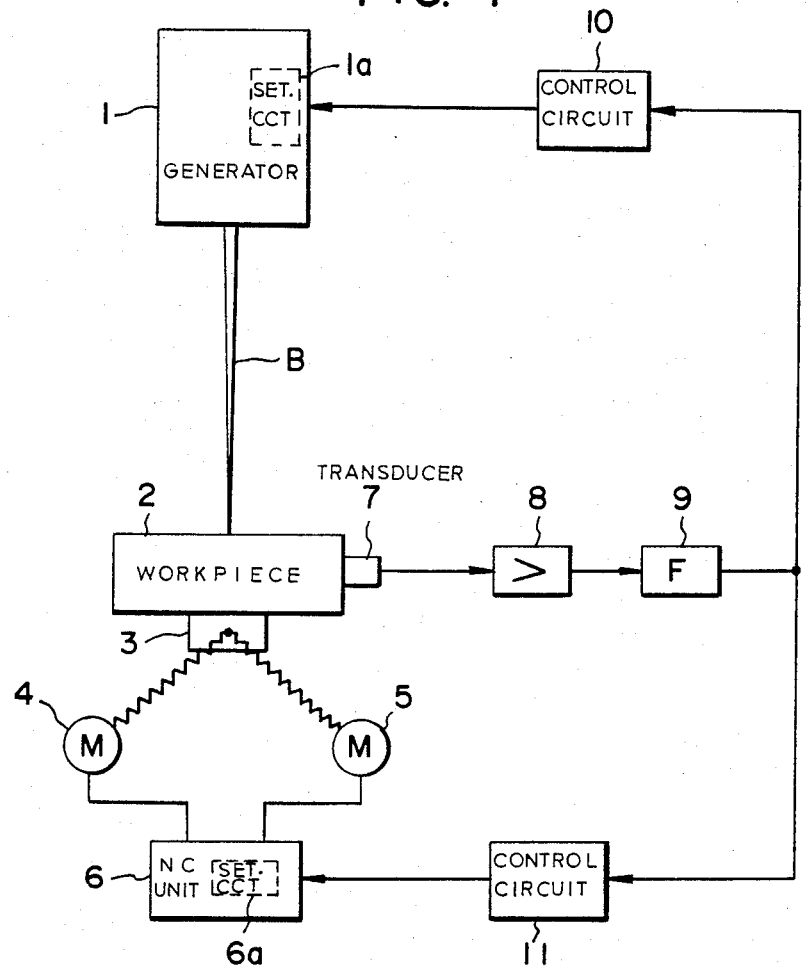
FIG. 1 diagrammatically illustrates an apparatus embodying the principles of the invention.

An energetic beam-machining apparatus shown in FIG. 1 comprises a beam generator 1 which provides an energetic beam B of electrons, ions, ion clusters, neutral particles, clusters of neutral particles or laser for processing a workpiece 2. The beam generator 1 itself is of conventional design and includes a beam energy setting circuit shown by a block 1a. The beam energy setting circuit 1a acts on one or more power supplies or control circuits therefor in the generator 1 required to create the eventual energetic beam B. For example, for a laser generator 1, a pumping power supply may be acted upon and for a generator of a ion or electron beam 1, a particle extraction voltage supply and/or a particle acceleration voltage supply may be acted upon.

The workpiece 2 in the path of the energetic beam B is securely mounted on a work table 3 which is movable by a pair of motors 4 and 5 in a horizontal plane orthogonal to the path for the energetic beam or a Z-axis. The motor 4 is used to displace the workpiece 2 along an X-axis orthogonal to the Z-axis and the motor 5 to displace the workpiece 2 along a Y-axis orthogonal to both X- and Z-axes. The motors 4 and 5 are driven in response to drive signals furnished from a feed controller 6, constituted typically by a numerical control (NC) unit. As the workpiece 2 is displaced, the energetic beam B effectively moves in a scanning manner over a desired area or along a desired path on the surface of the workpiece 2. The desired path or a prescribed set of paths of relative displacement required to scan the desired area is preprogrammed in the NC unit 6 and, in the operation of the apparatus, is reproduced and converted into drive pulses which are furnished to the drive motors 4 and 5. As is customary, a clock pulser, here regulated by a setting circuit 6a, is provided in the NC unit 6 to provide a time base with which the drive pulses are produced in accordance with the reproduced preprogram instructions. Thus, the output frequency of the clock pulser and hence the setting circuit 6a establishes the rate of relative displacement between the beam B and the workpiece 2. For example, a rectangular cavity can be machined by the energetic beam B from the generator 1 by causing the beam B to repetitively traverse a raster scan pattern between the preprogrammed X-Y limits and removing additional material during each scan pattern until it arrives at a prescribed depth. A nonrectangular contour cavity can be machined by causing the beam B to scan single lines of varying length and repeating a pattern formed by the single lines at progressively greater depths until the specified depth is reached. The workpiece 2 is placed in the usual or evacuated atmosphere dependent upon the particular energetic beam B produced by the generator 1.

In accordance with the principles of the present invention, an acousto-electrical transducer 7 is disposed in contact with the workpiece 2 for sensing acoustic emissions from the instantaneous beam-processing zones in the workpiece 2 to provide corresponding electrical signals. The transducer 7 is connected to an amplifier 8 which in turn is fed into a filter 9. An amplified and noise-free electrical signal reflecting the acoustic emissions is thus provided at the output of the filter 9 and is applied to control circuits 10 and 11. The control circuit 10 is associated with the beam energy setting circuit 1a in the generator 1 whereas the control circuit 11 is associated with the setting circuit for clock pulses 6a in the NC unit 6.

In a beam-machining (i.e. boring, cutting or etc.) operation, the instantaneous machining zone on the workpiece 2 bombarded with the energetic beam B from the generator 1 is heated, melted and vaporized. The amount of vaporization is generally proportional to the amount of energy of the beam. While a greater amount of energy is thus generally desirable to achieve a higher rate of beam machining, it has been found that there is a critical limit in the energy or energy density that can be applied to the beam, or an optimal energy level. The optimal energy level or critical limit varies from one site to another in a given workpiece material inasmuch as any material has a local change in morphology. When the energy or energy density exceeds such a critical limit, cracking or thermal distortion is caused in a beam-bombarded area on the workpiece surface. Thermal distortion is caused in a molten layer as a result of rapid heating and quenching. Cracking is generated around a beam-bombarded area. It is desirable that a workpiece be beam-machined with a highest efficiency, without leaving cracks or the like defects therein.

It has now been found that a beam-machined workpiece free from cracking or the like defects is obtained, yet with a maximum efficiency, by acoustically monitoring the workpiece which is being machined with an energy beam to provide a defect forming signal and, in response thereto, controlling one or more beam machining parameters. It has been discovered that the formation of cracking or the like defects, even in its microscopic size stage, can be indicated by a characteristic acoustic emission in a frequency range of 100 kHz to 1 MHz produced from an instantaneous beam-machined zone in which such a defect is being formed. This emission can be detected by the transducer 7 held in contact with the workpiece 2 and is converted into an appropriate electrical signal through the wave-form shaping circuits 8 and 9 to form a control signal in each of the circuits 10 and 11.

Figure 2:
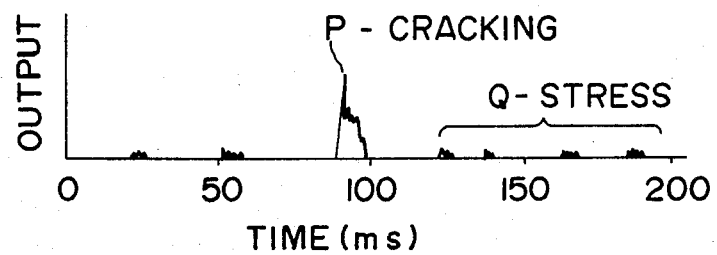
FIG. 2 is a graphical representation of acoustic signals versus time.

FIG. 2 shows acoustic signals which appear in a graphical chart in which the output voltage of the transducer 7 is plotted along the ordinate with respect to the beam-radiation time plotted along the abscissa. An acoustic emission, patterned "P", giving rise to a large output represents a cracking in the workpiece 2 being beam-machined whereas a multiplicity of acoustic emissions, patterned "Q", giving rise to a relatively small output represents stresses in the workpiece 2. Particular response characteristics of successive instantaneous areas of the workpiece 2 to the impinging beam B are precisely ascertained in this manner. The absence of any acoustic emission shows a satisfactory consumption of the beam energy by these areas for the desired machining action and may allow increase in the beam energy or energy density. The presence of an acoustic emissions "P" and "Q" indicate a cracking and thermal distortion being generated in these areas and requires the corresponding decreases in the beam energy or energy density. Each of the control circuits 10 and 11 may include a discriminator, constituted by a single- or multi-level Schmitt-trigger circuit, having one or more threshold levels for discriminating the output level of the acoustic emission detected by the transducer 7 and signal-shaped by the amplifier 8 and the filter 9 so that discrimination is made between the presence and absence of an acoustic emission or among the absence of any acoustic emission, an acoustic emission patterned "P" and an acoustic emission patterned "Q" to provide corresponding signals which act on the setting circuit 1a, 6a.

As mentioned previously, the setting circuits 1a and 6a are provided to regulate one or more parameters and those of the energy or energy density of the beam B and relative displacement between the beam B and the workpiece 2. Thus, the setting circuit 1a responding to a control output signal of the circuit 10 acts on the extraction voltage for producing energetic particles, e.g. ions, electrons or neutral particles, and/or the acceleration voltage for the formed particles in case the beam B is of such particles. Alternatively, in case the beam is a laser beam, the pumping energy supply and/or the laser converging power supply can be acted upon. In this manner, the energy or energy density of the beam B is increased and decreased in response to the absence of an acoustic emission and the presence of acoustic emissions "P" and/or "Q", respectively and thus is optimally controlled in accordance with particular response characteristics of the successive instantaneous areas of the workpiece 2 to the impinging beam B. On the other hand, the setting circuit 6a responding to a control output signal of the circuit 11 acts on the clock pulser in the NC unit 6 to regulate a parameter of clock pulses, e.g. the frequency thereof, to decrease and increase the rate of relative displacement between the beam B and the workpiece 2 in accordance with particular response characteristics of these areas of the workpiece 2 to the impinging B. In this manner, a desired beam-machining operation is accomplished with a maximum energy efficiency, without practically leaving cracking or any other defects in the machined workpiece 2.

What is claimed is:

1. A method of machining a workpiece composed, especially of a brittle material, with a focused energy beam, comprising the steps of:
   irradiating a localized region of the workpiece with the focused energy beam of a predetermined high energy density sufficient to vaporize the material at and thereby dislodge it from said region while permitting an acoustic emission to be in situ generated therefrom;
   relatively displacing the energy beam and the workpiece to displace said region of beam irradiation along a prescribed path on a surface of the workpiece at a predetermined rate of displacement, thereby machining the workpiece along said path;
   monitoring said acoustic emission to detect a characteristic acoustic signal therein representing development, in said localized region of material dislodgment, of a particular stress which tends to form a defective thermal distortion or cracking in the workpiece around said region upon vaporization; and
   in response to said detected characteristic signal, modifying at least one of said energy density of the beam and said rate of displacement in a manner to assure that said workpiece machined is substantially free from said defective thermal distortion or cracking.

2. The method defined in claim 1 wherein said beam is a beam of energetic particles and said energy density of the beam is controlled by controlling the velocity of the energetic particles impinging on the workpiece surface.

3. The method defined in claim 2 wherein said energetic particles comprise at least in part particles of at least one of kinds selected from the group which consists of neutral particles and ions, and said velocity is controlled by controlling an acceleration energy for said particles.

4. The method defined in claim 1 wherein said beam is a beam of energetic particles comprising at least in part ions, and said energy density is controlled at least in part by controlling an extraction voltage for extracting said ions from a source thereof.

5. The method defined in claim 1 wherein said beam is a laser beam and said energy density is controlled by controlling the pumping energy for producing the laser.

6. The method defined in claim 1 wherein said beam is a laser beam and said energy density is controlled by controlling the rate of convergence of said laser.

7. The method defined in claim 1 wherein said workpiece is displaced relative to said beam incrementally in response to a sequence of drive pulses and said rate of relative displacement is controlled by controlling the frequency of said drive pulses.

8. An apparatus for machining a workpiece composed, especially of a brittle material, with a focused energy beam, comprising:
   a beam generator spacedly juxtaposable with the workpiece for applying to a localized region thereof the focused energy beam with a predetermined high energy density sufficient to vaporize the material at and thereby dislodge it from said region of beam irradiation in the workpiece;
   means for relatively displacing said beam generator and said workpiece to displace said region of localized vaporization along a prescribed path on a surface of the workpiece at a predetermined rate of displacement, thereby machining the workpiece along said path, said region of beam irradiation in situ generating an acoustic emission;
   detector means for sensing said acoustic emission to detect a characteristic acoustic signal therein representing development, in said localized region of material dislodgment, of a particular stress which tends to form a defective thermal distortion or cracking in the workpiece around said region upon vaporization;
   control means responsive to said characteristic signal for controlling at least one of said energy density of said beam and said rate of displacement in a manner to assure that said workpiece machined is substantially free from said defective thermal distortion or cracking.

9. The apparatus defined in claim 8 wherein said beam generator is adapted to generate a beam of energetic particles constituting said energy beam and includes means for accelerating said energy beam for impingement upon said workpiece surface and said control means is connected to said acceleration means for controlling the kinetic energy of said energetic particles.

10. The apparatus defined in claim 9 wherein said energetic particles comprise at least in part ions, said acceleration means comprises a voltage supply for applying an accelerating voltage to said ions, and said control means is connected to said voltage supply for controlling the magnitude of said accelerating voltage.

11. The apparatus defined in claim 8 wherein said generator includes a generator adapted to generate energetic ions and including a power supply for extracting said energetic ions from a source thereof, and said control means is connected to said power supply for controlling the density of said energetic ions in said beam.

12. The apparatus defined in claim 8 wherein said generator is adapted to generate a laser beam constituting said energy beam and includes a pumping power supply for the laser, and said control means is connected to said pumping power supply for controlling said energy of the beam.

13. The apparatus defined in claim 8 wherein said displacement means include motor means driven by a succession of drive pulses for displacing said workpiece relative to said generator and said control means is operative in response to said control signal for controlling the frequency of said drive pulses.

14. The method defined in claim 1 wherein said beam is a beam of energetic particles comprising at least in part particles of at least one of kinds selected from the group which consists of neutral particles and ions.

* * * * *